United States Patent [19]

Kutsch et al.

[11] Patent Number: 5,339,379
[45] Date of Patent: Aug. 16, 1994

[54] TELECOMMUNICATION FIBER OPTIC CABLE DISTRIBUTION APPARATUS

[75] Inventors: Duane B. Kutsch, Otis Orchards; Glen M. Larson; Lloyd W. Lohf, both of Spokane, all of Wash.; Paul D. Johnson, Post Falls, Id.

[73] Assignee: Telect, Inc., Liberty Lake, Wash.

[21] Appl. No.: 79,054

[22] Filed: Jun. 18, 1993

[51] Int. Cl.5 .............................. G02B 6/36
[52] U.S. Cl. ................... 385/135; 385/147
[58] Field of Search ............ 385/53, 134, 135, 136, 385/137, 147

[56] References Cited

U.S. PATENT DOCUMENTS

| | | | |
|---|---|---|---|
| 4,266,853 | 5/1981 | Hutchins et al. | 385/135 |
| 4,319,951 | 3/1982 | Korbelak et al. | 156/502 |
| 4,595,255 | 6/1986 | Bhatt et al. | 385/135 |
| 4,630,886 | 12/1986 | Lauriello et al. | 385/135 |
| 4,648,168 | 3/1987 | Nolf et al. | 385/135 |
| 4,752,110 | 6/1988 | Blanchet et al. | 385/135 |
| 4,770,357 | 9/1988 | Sander et al. | 242/54 R |
| 4,792,203 | 12/1988 | Nelson et al. | 385/135 |
| 4,824,196 | 4/1989 | Bylander | 385/134 |
| 5,067,784 | 11/1991 | Debortoli et al. | 385/53 |
| 5,093,887 | 3/1992 | Witte | 385/135 |
| 5,167,001 | 11/1992 | Debortoli et al. | 385/135 |
| 5,179,617 | 1/1993 | Stockman | 385/136 |
| 5,240,209 | 8/1993 | Kutsch | 248/49 |
| 5,247,603 | 9/1993 | Vidacovich et al. | 385/135 |

FOREIGN PATENT DOCUMENTS

| 59-83119 | 5/1984 | Japan | 385/135 |
|---|---|---|---|
| 2166262A | 4/1986 | United Kingdom. | |

OTHER PUBLICATIONS

"FPP-12 Fiber Patch Panel", Telect, Inc. #8962 (Undated) Product Brochure, 2 pages.
"FDP-12 Fiber Distribution Panel", Telect, Inc., #7962 (undated) Product Brochure, 2 pages.
"Fiber Distribution Center (FDC)", Siecor Corporation, 1986 (No month) Product Brochure, 2 pages.
"Fiber Distribution Panel User Manual", ADC Telecommunications, 1986 (no month), 20 pp.
"NT6F26 Fiber Patch Panel Assembly", Product Brochure, Northern Telecom, Inc., #14047/05, Issue 4 (undated), 2 pp.
"F83AK8510 Lightguide Stranded Cable Interconnection Terminal (LSCIT)", AT&T Product Brochure & Description, Mar. 1984, 59 pp.

Primary Examiner—John D. Lee
Attorney, Agent, or Firm—Wells, St. John, Roberts, Gregory & Matkin

[57] ABSTRACT

A telecommunication fiber optic distribution apparatus 10 is illustrated in the drawings and includes a plurality of vertically spaced tray housings or shelves 18 that are mounted between vertical frame columns 16. Each of the tray housings slidably supports a plurality of optical fiber trays 20 that are movable linearly outward from a storage retracted position within the housing to an extended service position. Each of the trays has one or more cable carriers 60 that support and protect the optical fibers from being bent in an arc having a radius of curvature less than a predetermined value. Each of the trays 20 includes reels for storing extra lengths of the optical fibers. Releasable guides 46 are mounted along the outside of the housing for guiding fiber optic cable in a vertical direction to the desired shelves. Additionally, individual cable guides 44 are positioned adjacent the rear corners of the housing for additionally guiding the individual cables into and out of the carriers 60.

27 Claims, 12 Drawing Sheets

FIG 7

TELECOMMUNICATION FIBER OPTIC CABLE DISTRIBUTION APPARATUS

TECHNICAL FIELD

This invention relates to telecommunication fiber optic cable distribution bays and panels.

BACKGROUND OF THE INVENTION

Generally a telecommunication fiber optic cable distribution bay or panel is located in the central office of a telephone system or at a remote location near or on the customer's premises. The purpose of the distribution bay or panel is to provide termination and cross-connect interface between fiber optic trunk cables and fiber optic distribution cables that lead to user installations. Frequently such bays include multiple trays that have fiber optic splice, cable storage and/or cross-connection connectors facilities. Normally the trays are maintained in their retracted storage position during normal operation and are pulled or moved outward to an extended position when access is desired for installation, repair, monitoring or reconnection.

Because of the very delicate and exacting nature of optical fibers, it is important that the individual fiber not be overly bent or unduly stressed in the distribution system. Otherwise the transmission effectiveness and efficiency may be compromised. Consequently consideration must be given in the design, construction and operation of the trays so that the fiber optic cable(s) are not subjected to compromising bends or stresses.

Two examples of previous bays are illustrated in U.S. Pat. No. 4,792,203 granted to Calvin G. Nelson et al. on Dec. 20, 1988, and U.S. Pat. No. 4,824,196 granted to James R. Bylander on Apr. 25, 1989. Both patents describe telecommunication fiber optic distribution bays having multiple trays in which the trays are designed having various channels and fixed guide surfaces for holding the fiber optic cables in fixed orientations. Generally, such arrangements are relatively expensive and require substantial time to place the cables in the proper channel.

One of the principle objects and advantages of the present invention is to provide a much improved telecommunication fiber optic distribution bay or panel that better protects the fiber optic cables and prevents the cables from being compromised with undesirable bends or stresses when the trays are being moved between their retracted positions and their extended positions.

An additional advantage of the present invention is to provide a much improved telecommunication fiber optic distribution bay that is more efficient in the placement and management of the fiber optic cables within the bay.

These and other objectives and advantages of this invention will become apparent upon the careful review of the following description of the drawings and description of a preferred embodiment.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
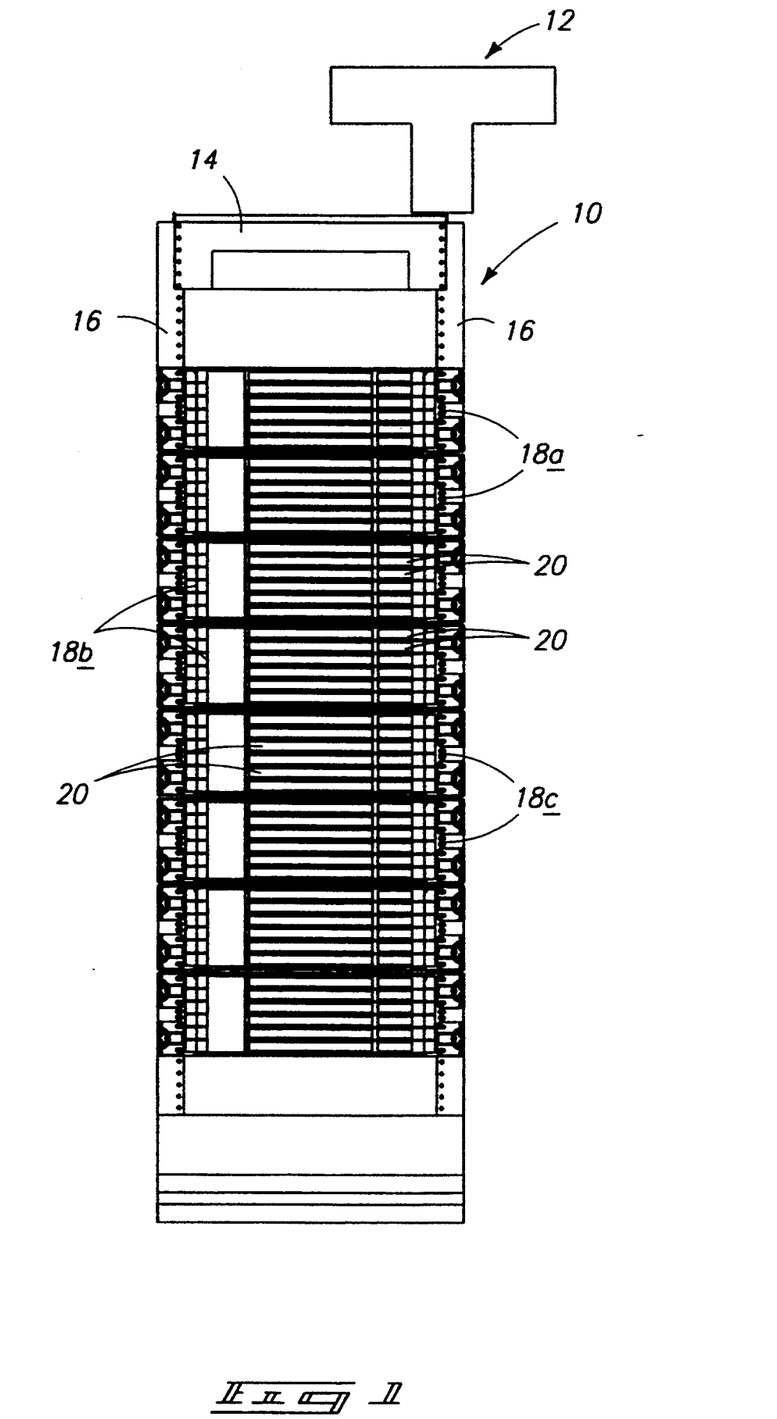
FIG. 1 is a front elevational view of a preferred embodiment of the present invention illustrating a telecommunication fiber optic baY having a series of vertically stacked tray shelves.

Turning now in detail to the drawings, there is illustrated in FIG. 1 a telecommunication fiber optic distribution apparatus, generally designated with the numeral 10, for cross-connecting optical fibers of a main trunk cable to multiple optical fibers of distribution cables. The apparatus is frequently referred to as a telecommunication cross-connect bay or panel that is generally located in a central facility of a telephone company or at a remote location near or at a customer's premises.

The fiber optic cables are frequently fed to and from the apparatus 10 from an overhead cable distribution system 12 as illustrated in FIG. 1.

Figure 2:
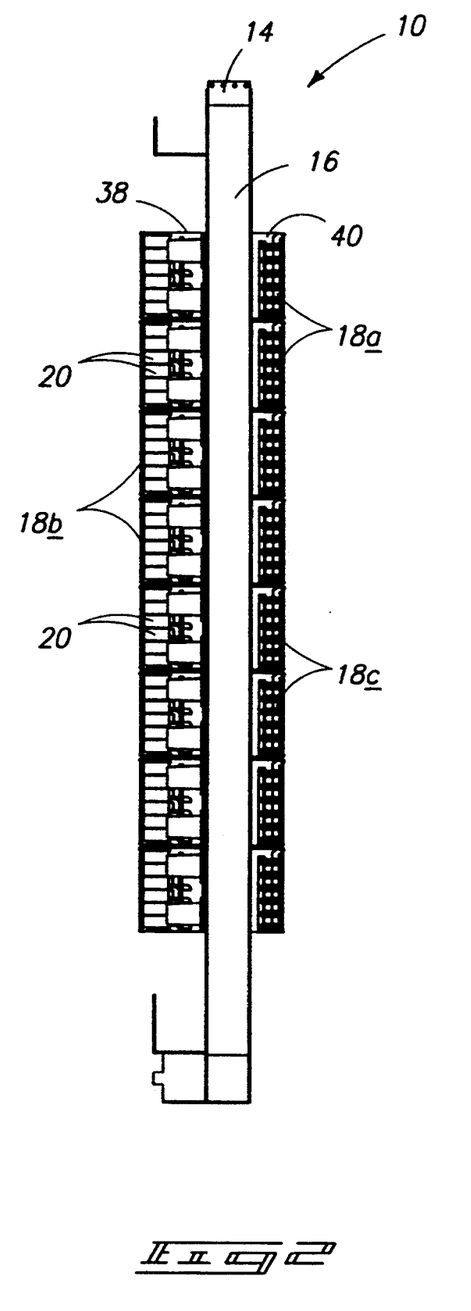
FIG. 2 is a side elevational view of the preferred embodiment illustrated in FIG. 1.
Figure 3:
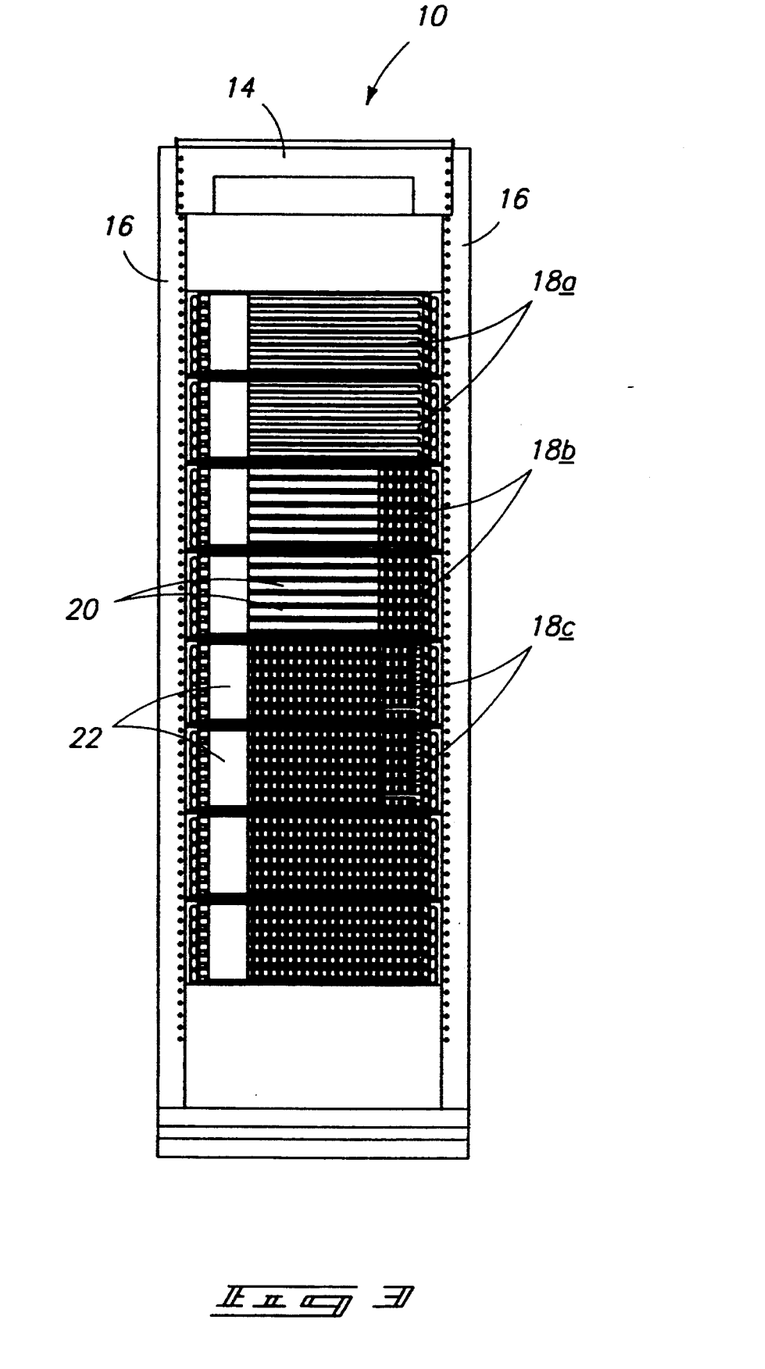
FIG. 3 is a rear elevational view of the preferred embodiment illustrated in FIG. 1.

The apparatus includes an upright rack frame 14 having at least two spaced upright side columns or frame elements 16 on which a plurality of vertically spaced tray housings or shelves 18 are positioned as illustrated in FIGS. 1-3. A typical housing or shelf 18 is illustrated in more detail in FIGS. 4-7.

Figure 6:
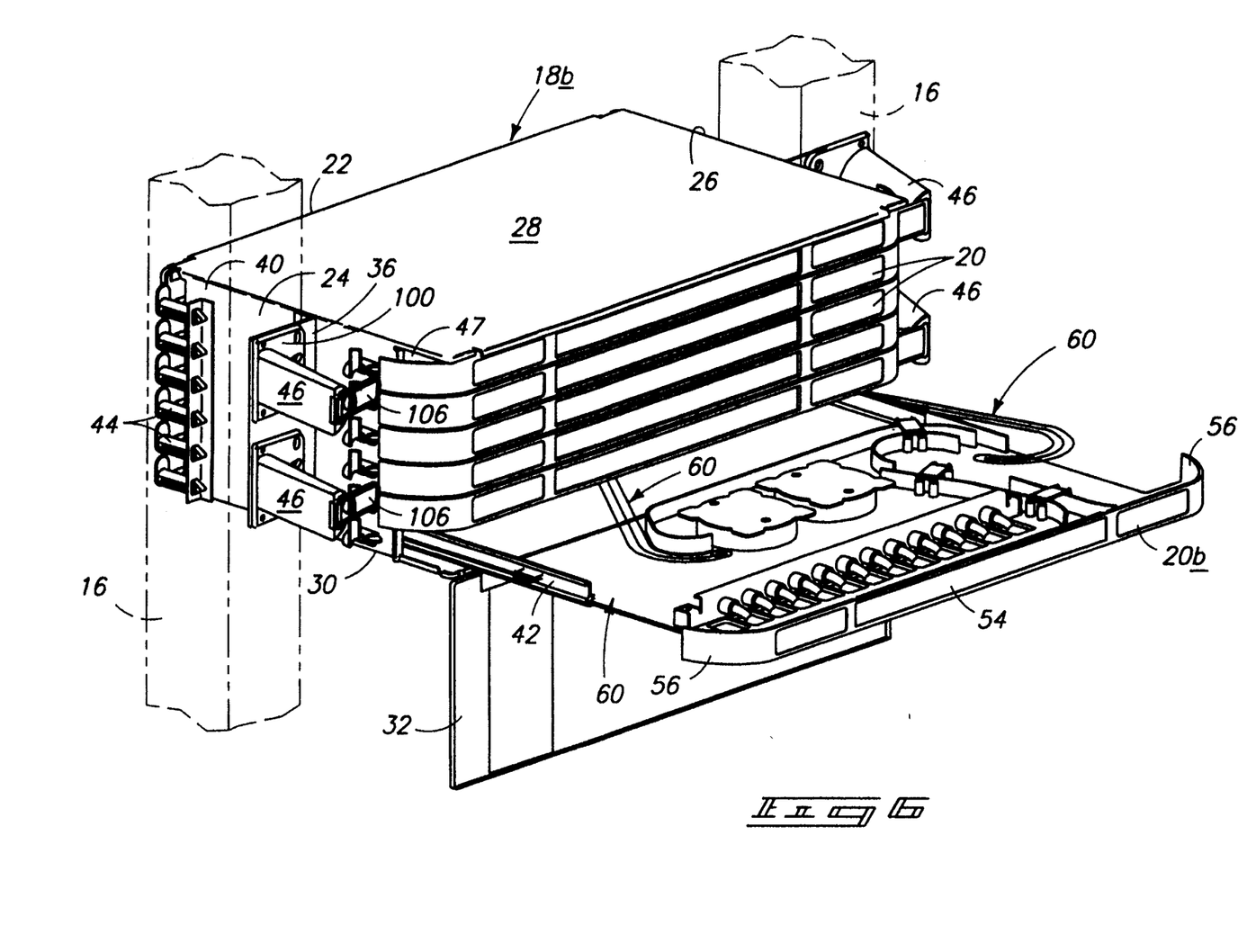
FIG. 6 is an isolated isometric view similar to FIG. 4, except showing a connector shelf with one of its fiber optic cable cross-connect connector trays in an extended position providing access to its interior.
Figure 7:
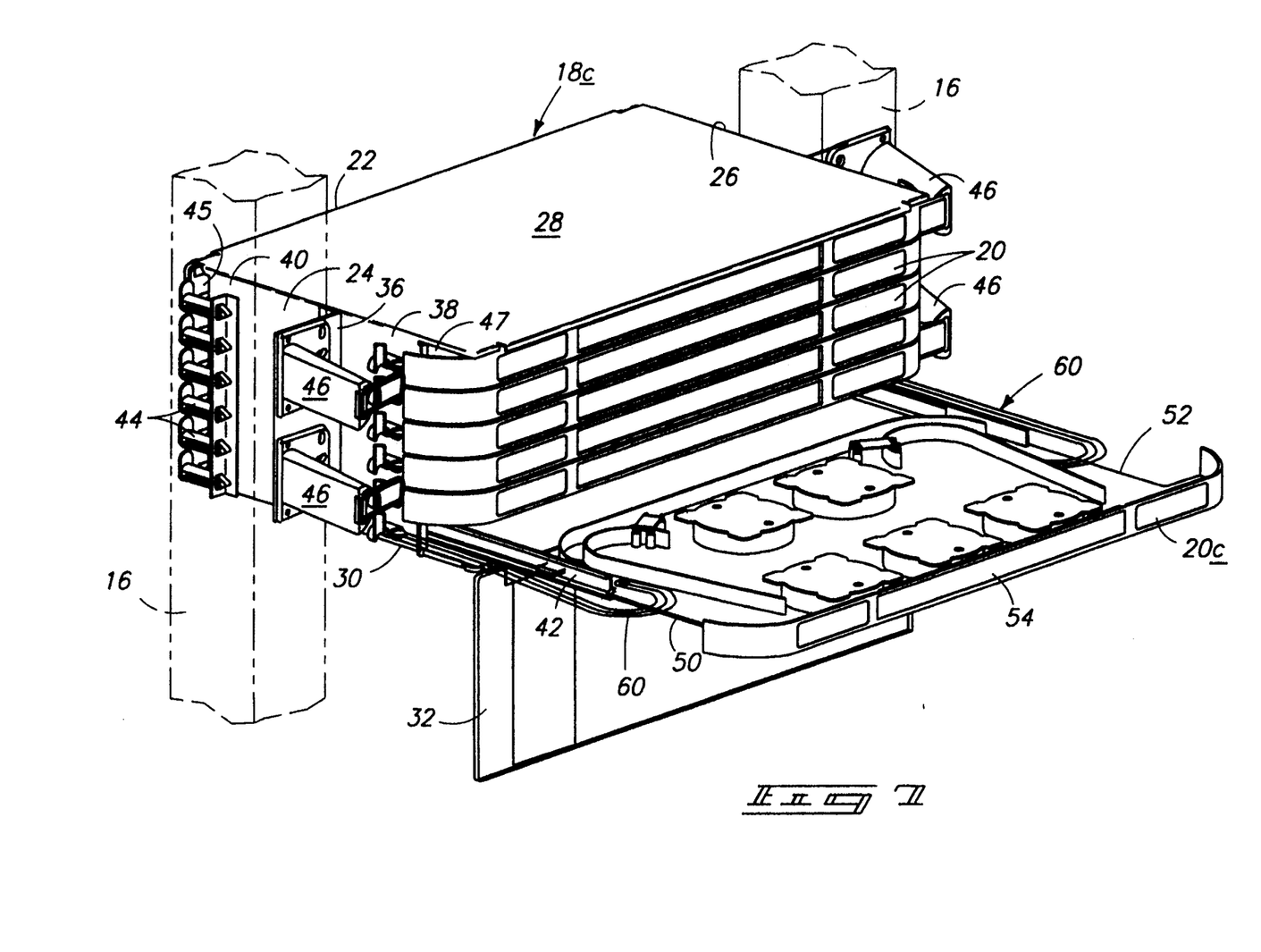
FIG. 7 is an isolated isometric view similar to FIG. 4, except showing a storage shelf with one of its fiber optic cable storage trays in an extended position providing access to its interior.
Figure 9:
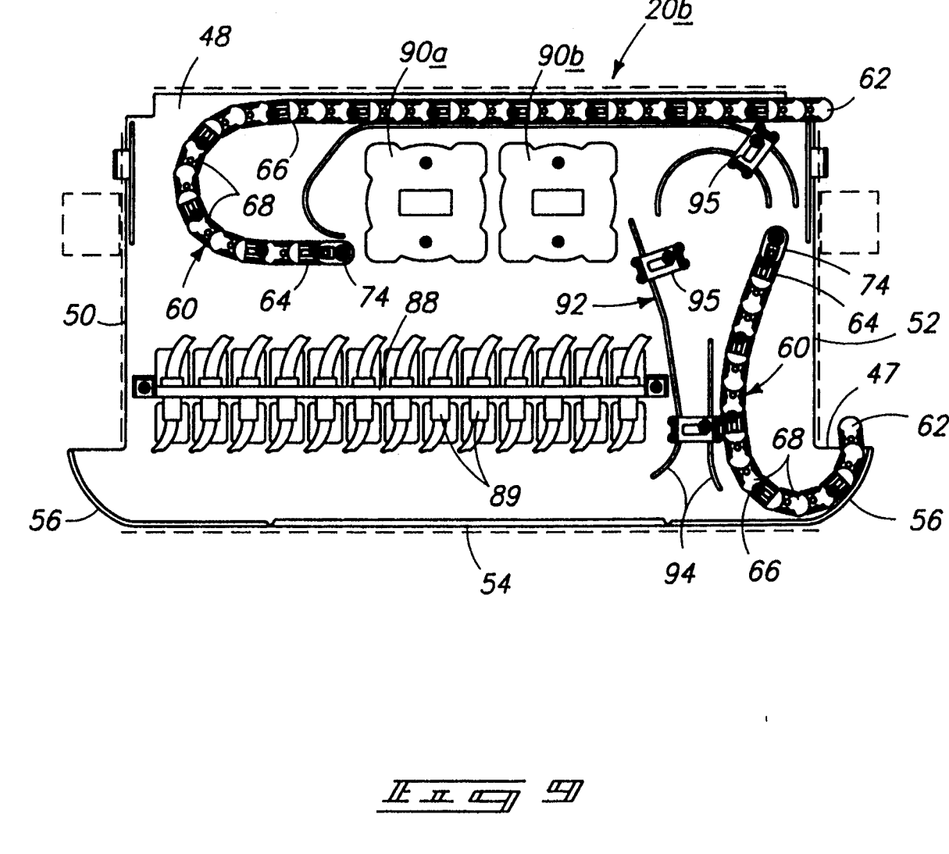
FIG. 9 is an isolated plan view of the fiber optic cable cross-connect connector tray shown in FIG. 6, except showing the tray in the retracted position.
Figure 10:
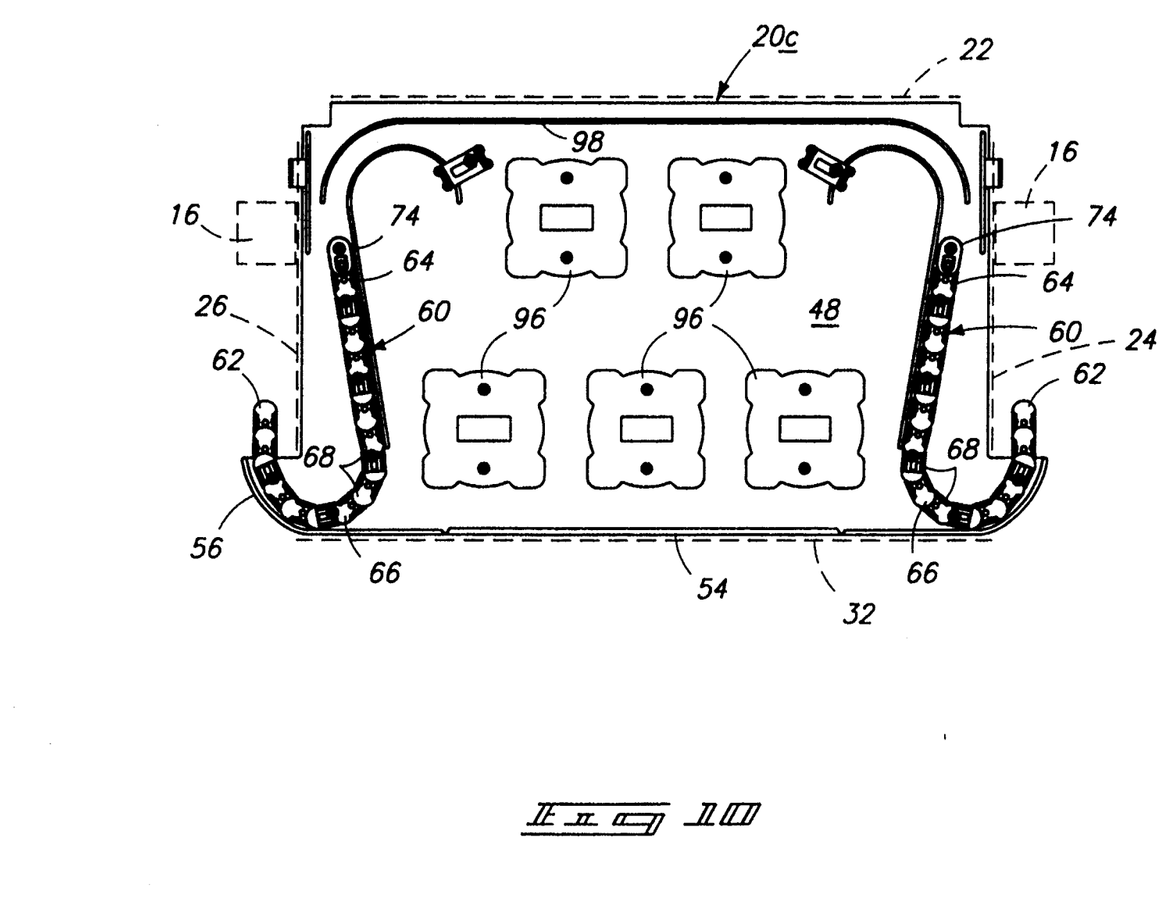
FIG. 10 is an isolated plan view of the fiber optic cable storage trays as illustrated in FIG. 7, except showing the tray in the retracted position.

Each of the tray housings 18 contains a plurality of fiber optic trays or drawers generally designated with the numeral 20. Generally, one housing 18a contains splice trays 20a (FIGS. 5 and 8); a second housing 18b contains cross-connecting connector trays 20b (FIGS. 6 and 9); and a third housing 18c contains storage trays 20c (FIGS. 7 and 10).

Each tray housing 18 includes at least a partial back wall 22, sidewalls 24 and 26, top wall 28, and bottom wall 30 forming an enclosed space. Additionally, the housing 18 has a hinged front wall or cover 32. Each of the housings or shelves 18 is positioned between the side columns 16 and mounted thereto by support brackets 36. A forward vertical channel 38 and a rear vertical channel 40 are formed forward and rearward, respectively, of the upright columns 16 (FIG. 2) adjacent each of the shelves 18 to facilitate the vertical distribution of the fiber optic cables to and from the overhead distribution system 12 and between the shelves 18.

Figure 4:
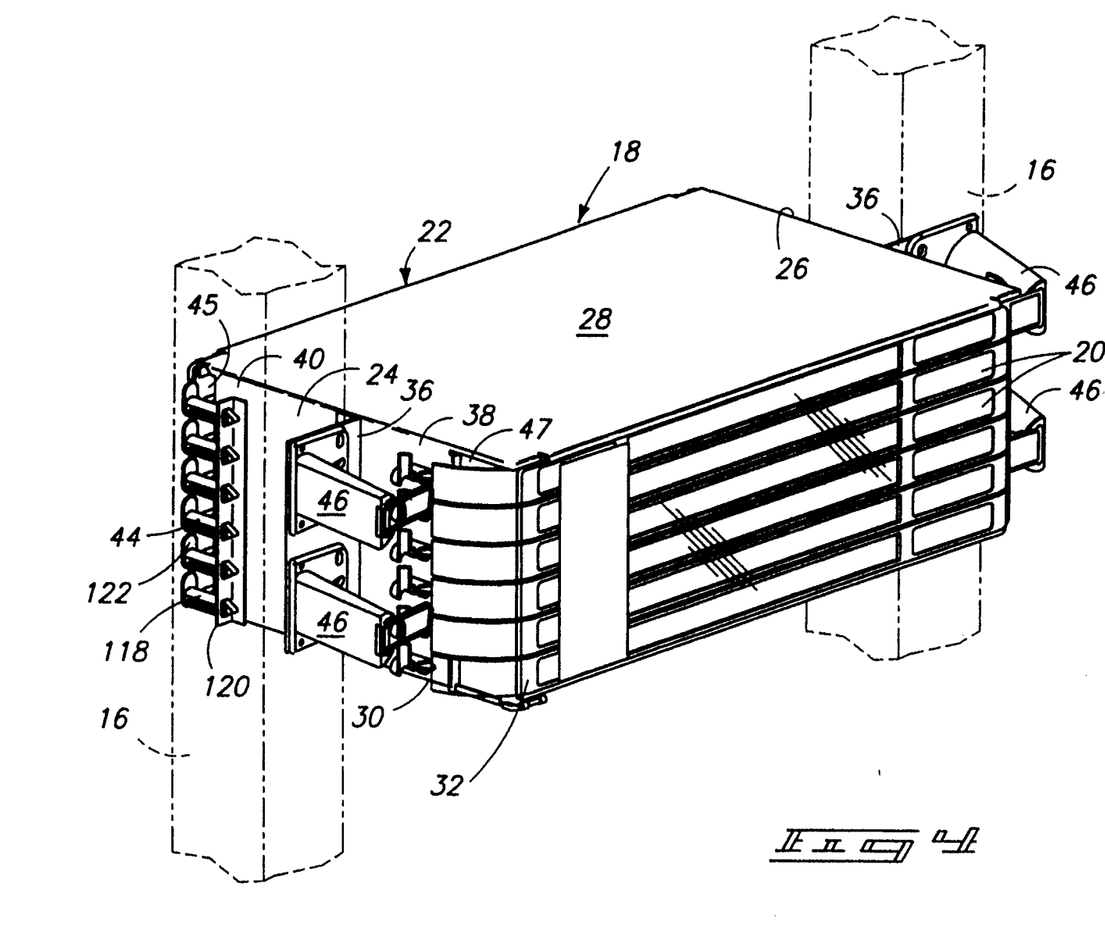
FIG. 4 is an isolated isometric view of one of the tray shelves of the fiber optic telecommunication bay illustrated in FIG. 1 showing multiple trays in their retracted positions.
Figure 13:
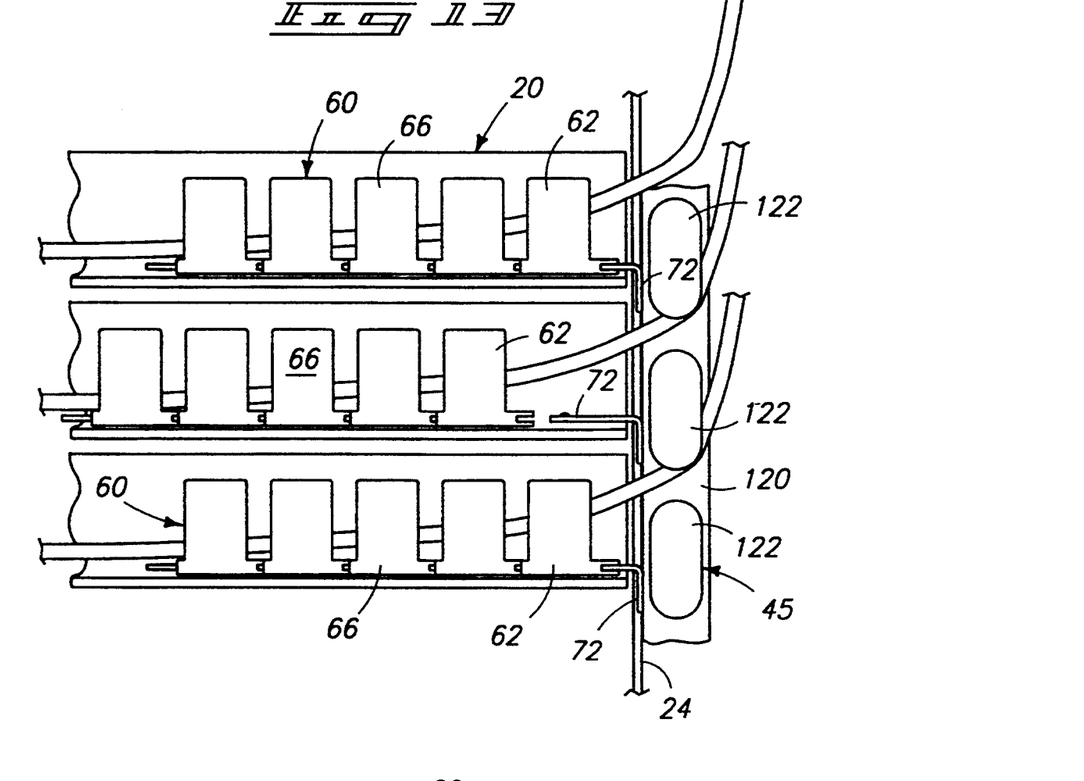
FIG. 13 is a fragmentary rear view of a rear corner of a housing, illustrating individual cable guides for guiding individual cables to the trays and anchor brackets for anchoring one end to articulating tray cable guides.
Figure 14:
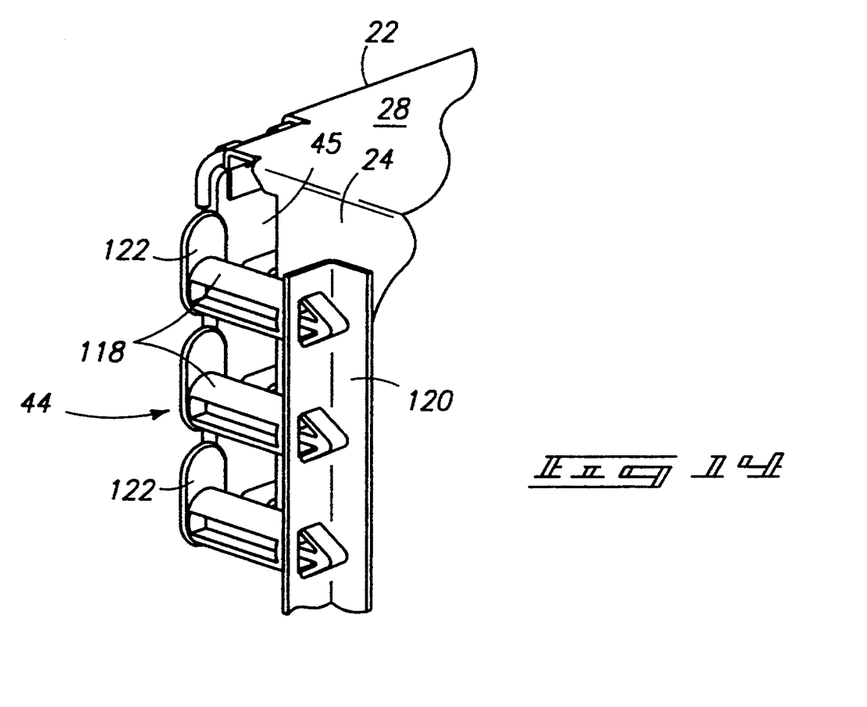
FIG. 14 is a fragmentary side view of the rear corner of the housing, shown in FIG. 13 illustrating the individual cable guides.

Each of the housings or shelves 18 has vertically spaced drawer or tray slide supports 42 (FIGS. 5–7) affixed on the interior of sidewalls 24 and 26 for slidably receiving the trays 20. The apparatus 10 further includes individual cable guides 44 mounted to the sidewalls 24 and 26 of the housing 18 in the rear vertical channel 40 as illustrated in FIGS. 4, 13 and 14 for guiding individual cables from the rear vertical channel 40 through opening 45 in sidewalls 24 and 26 to the trays 20. The individual cable guides 44 correspond with the trays 20.

Additionally, the apparatus 10 includes bulk cable guides 46 (FIGS. 4–6) that are positioned at vertically spaced locations along the forward vertical channel 38 to receive and manage cables in their vertical path between trays 20 and housings 18. The guides 46 guide the cables along the forward vertical channel 38 through side openings 47 in the sidewalls 24 and 26 as illustrated in FIGS. 4–7.

Figure 5:
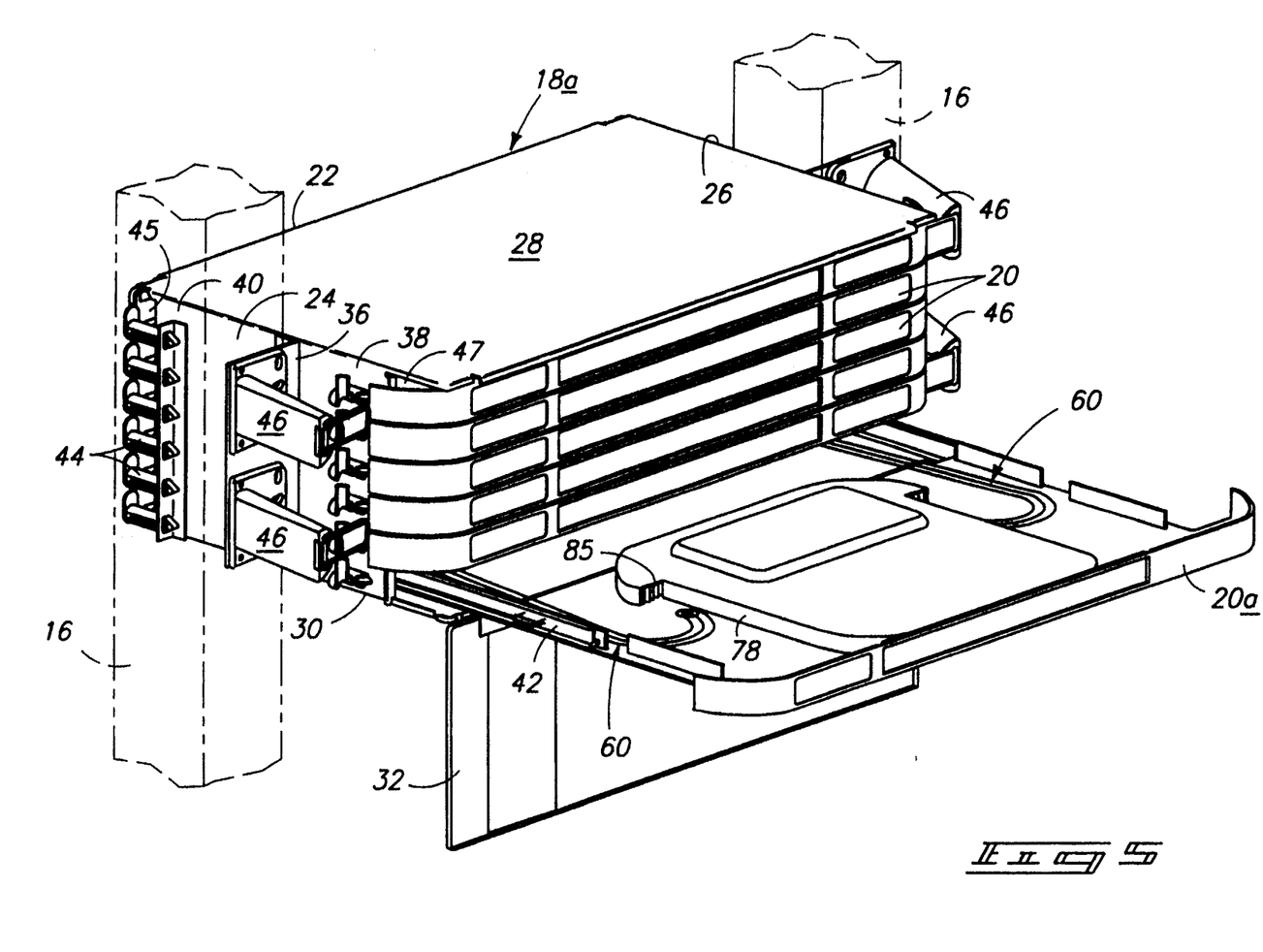
FIG. 5 is an isolated isometric view similar to FIG. 4, except showing a splice shelf with one of its splice trays in an extended position providing access to its interior.

Each of the trays 20 (FIGS. 8–10) includes a floor 48 that extends laterally outward to side edges 50 and 52, respectively, and forward to a front wall 54. The side edges 50 and 52 are slidably mounted to the drawer or tray slide supports 42 as illustrated in FIGS. 5–7. The front wall 54 has lateral ends 56 that extend outward beyond the side edges 50 and 52 in a curved arc to further protect the fiber optic cables and to provide gripping means to enable the user to easily grip and slide a selected tray from a storage retracted position within the enclosed housing space to an extended service position to enable an installer or repair person to have easy access to the interior of the trays.

Figure 8:
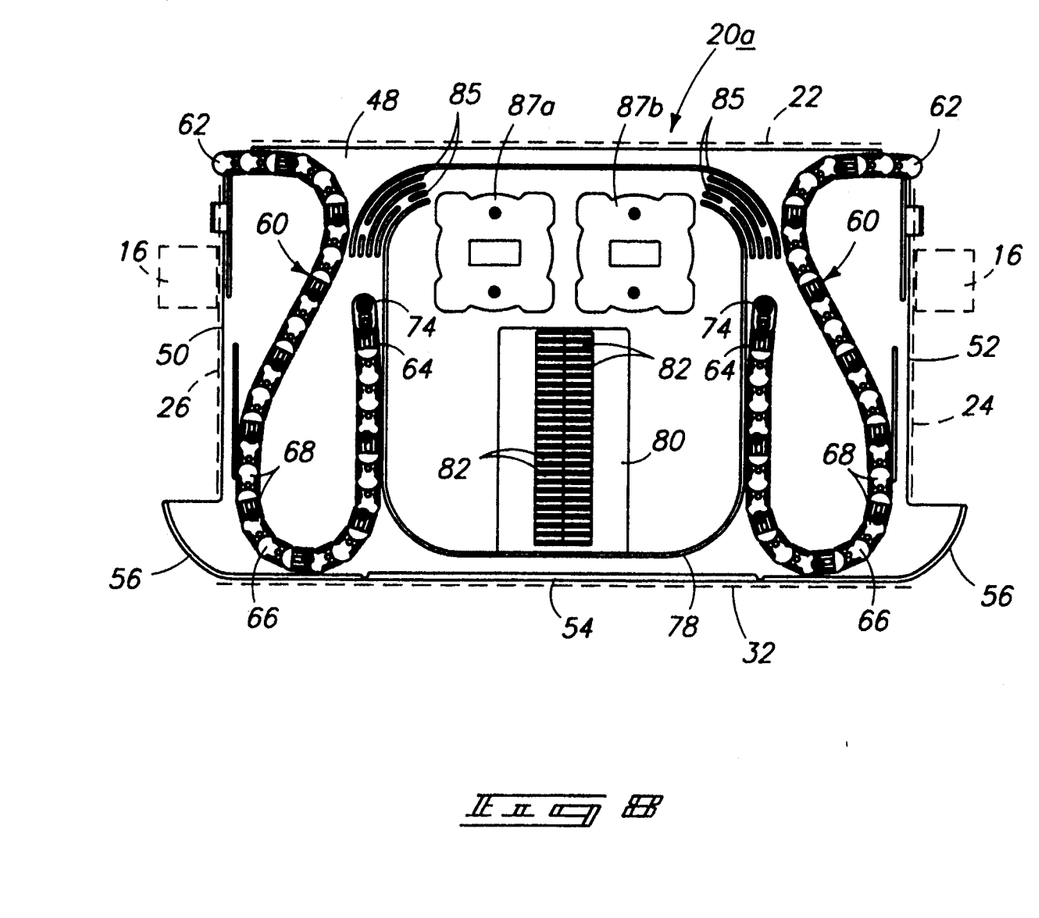
FIG. 8 is an isolated plan view of the splice tray shown in FIG. 5, except showing the splice tray in the retracted position.

The apparatus 10 further includes at least one elongated fiber optic cable carrier 60 mounted in each of the trays 20 (FIGS. 5–9) for receiving and supporting at least one fiber optic cable to protect the cable fibers and to prevent the cable fibers from being bent in an arc having a radius of curvature less than a predetermined value as the trays are moved between the retracted position and the extended service position. Each of the carriers 60 includes one end 62 that is operatively connected to the housing 18 and an opposite end 64 that is operatively connected to the interior of the tray 20 (FIGS. 8–10).

Each of the carriers 60 include an articulating intermediate section 66 that is movable in a sliding snake-like fashion over the floor 48 with the movement of the trays 20 between the retracted and extended positions to protect and prevent bending of the cable fibers in an arc less than the prescribed radius of curvature. The carrier 60 is preferably comprised of a plurality of releasably interconnected links 68 that are pivotally attached to each other for limited pivotal movement relative to each other to form a limited arc as illustrated more specifically in FIGS. 9–10. Each of the links 68 are releasably interconnected to each other so that the length of the carrier 60 may be easily adjusted by deleting or adding links. The specific structure of the links 68 is shown in more detail in a co-pending U.S. patent application Ser. No. 07/977,886, filed Nov. 17, 1992, by Duane B. Kutsch, and entitled "Telecommunication Multiple Cable Carrier" (now U.S. Pat. No. 5,240,209. The Kutsch co-pending patent application is incorporated herein by reference with respect to the details of carrier 60 and the specific configuration of the links 68.

Each of the carriers 60 includes a housing carrier anchor 72 that anchors the one end 62 stationarily to the housing 18 as illustrated in FIG. 13. Additionally, the carrier 60 includes a tray carrier anchor 74, that is illustrated in FIGS. 8–10, allowing the intermediate section 66 to slide over the floor 48 as the tray is moved between the retracted position and the extended service position without the fiber optic cables being unduly bent.

More particularly, FIG. 5 illustrates a splice housing 18a showing a splice tray 20a that is pulled outward from the storage position to the extended service position to provide access to the interior of the tray. The tray 20a (FIG. 8) includes an enclosed interior splice wall 78 that surrounds a splice connector block 80 having a plurality of fiber optic splice connectors 82. The splice tray 20a includes a plurality of curved fixed guide walls 85 for receiving the fiber optic cables from the carriers 60 and directing the fiber optic cable into the interior wall 78 as illustrated in FIG. 8. The splice tray 20a includes fiber storage reels 87a and 87b for receiving extra lengths of the optical fibers.

In a preferred embodiment, a fiber cable from a trunk line passes into the splice tray 20a and are optically connected by the splice connectors 82 to ends of pigtail optical fibers (not shown). The pigtail optical fibers then pass from the splice tray 20a to a distribution connector tray 20b illustrated in FIG. 9.

The distribution connector tray 20b includes a cross-connect connector block 88 for receiving cross-connectors 89 such as those illustrated in Nelson et al. U.S. Pat. No. 4,792,203, granted Dec. 20, 1988, and those shown in the Bylander U.S. Pat. No. 4,824,196, granted Apr. 25, 1989. The distributor connector tray 20b includes storage reels 90a and 90b for receiving excess lengths of the pigtail or intermediate optical fibers and the distribution optical fibers (not shown).

The distribution connector tray 20b further includes guide channel 92 having an entrance 94 for receiving the distribution cables from the connector block 82 and guiding the cables to a fiber optic cable carrier 60 prior to exit through one of the side openings 47. The guide channel 92 includes releasable latches 95 to assist in the mounting and retention of the optical fibers in the guide channels 92.

The storage tray 20c as illustrated in FIG. 10 includes a plurality of storage reels 96 there utilized for storing excessive lengths of either the optical fibers from the trunk cable, or extra distribution cable or extra lengths of intermediate pigtail optical fibers. The storage tray 20c includes a fiber guide channel 98 for guiding the fibers from the carriers 60 to the storage reels 96.

All of the storage reels have radius of curvatures that are greater than the preselected value to prevent undue bending of the optical fibers.

The bulk cable guides 46 that are shown in FIGS. 4–7 enable the installer or repair person to easily mount or remove cables that pass along the forward vertical channel 38 as necessary.

Figures 11, 12:
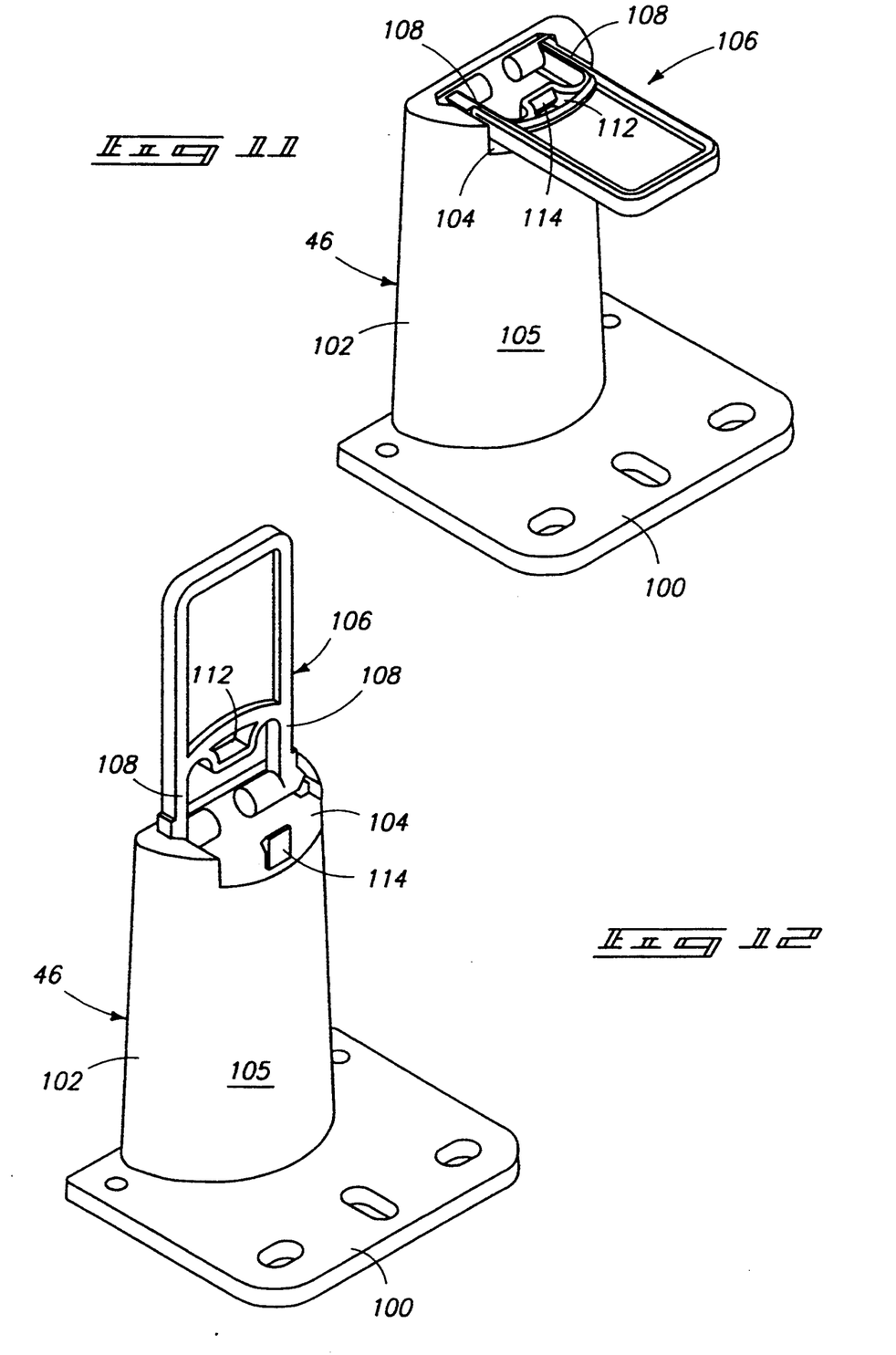
FIG. 11 is an isolated isometric view of a releasable fiber optic multiple cable management guide, shown in a closed position.
FIG. 12 is an isolated isometric view similar to FIG. 11, except showing the guide in an open position.

FIGS. 11–12 illustrate a single bulk cable guide in isolated view. Each of the guides 46 includes a base 100 for mounting to support brackets 36 on the housing 18. Alternatively, the base 100 may be mounted to the upright columns 16 themselves. The base 100 has a plurality of attachment apertures formed therein to facilitate the secured attachment of the guide 46 to the housing 18. Each guide 46 includes a side pedestal 102 that extends upward to an upper end 104. The pedestal 102 has a curved side surface 105 that has a slightly enlarged base and extends upward at a progressively reduced radius to facilitate the installation and removal of cables from the forward vertical channel 38.

Each of the guides 46 includes a gate 106 pivotally mounted at the upper end 104 that is pivotal from a closed position illustrated in FIG. 11 to an open position illustrated in FIG. 12. The gate 106 has legs 108 that are pivotally mounted to the upper end 104. Each guide 46 includes a latch for releasably securing the gate 106 in the closed position to hold the cables securely within the channel 38. The latch includes an aperture 112 formed in the gate 106 with a integral spring clasp 114 projecting upward from the pedestal 102 for engaging an edge of the aperture 112 to releasably secure the gate 106 in the closed position.

The individual cable guide 44 is illustrated in more detail in FIGS. 13 and 14. Each of the guides 44 is associated with a corresponding tray and includes a projection 118 that extends rearward from a housing bracket 120 to an abutment flange 122 at the end thereof for receiving and guiding fiber optical cable from the rearward vertical channel 40 into the one end 62 of the carrier 60 adjacent rear corners of the housing 18. Each of cable guides 44 are releasably mounted in the flange 120 to facilitate construction of each of the housings 18.

During initial installation, a trunk cable from the overhead distribution system 12 is attached to the vertical channels 16 or the sidewalls 24 or 26 of the housing 18 in vertical orientations. The individual cables of the trunk cable then are directed to the desired trays via the individual cable guides 44. The fiber optic cables then are positioned in a carrier 60, and guided to the desired location within the tray depending upon the type and function of the tray. For example, in the splice tray 20a as illustrated in FIG. 8, the cable fibers are connected to pigtail intermediate optical fibers at the splice connectors 82. The pigtail fibers then pass through the second carrier 60 to a storage tray 20c or a distribution cable tray 20b. The distribution cables then pass out from the tray 20b through the side openings 47 and then upward or downward along the forward vertical channel 38 to other shelves 18 or to other telecommunication equipment through the overhead distribution system.

One can appreciate that the apparatus 10 provides a very efficient management of the fiber optic cables while fully protecting the fiber optical cables and preventing them from being bent in an arc that is less than a preselected value.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A telecommunication fiber optic distribution apparatus for cross-connecting first optical fibers from a multi-fiber cable to second optical fibers from a plurality of distribution cables, comprising:

a tray support housing;

a plurality of optical fiber trays movably mounted to the housing for movement relative to the housing between a retracted storage position and an extended service position;

elongated multi-fiber carriers mounted within the trays, each having one end operatively connected to the support housing and an opposite end operatively connected to the tray and an articulating intermediate section that retracts and extends with corresponding movement of the trays for receiving and supporting the first and second optical fibers within the trays to protect and prevent the fibers from being bent in an arc having a radius of curvature that is less than a prescribed value during such tray movement.

2. The telecommunication fiber optic distribution apparatus as defined in claim 1 wherein each tray has a pair of carriers, one for receiving and supporting incoming fibers and another for receiving and supporting outgoing fibers.

3. The telecommunication fiber optic distribution apparatus as defined in claim 1 wherein one of the trays contains multiple splice connectors for optically interconnecting the first optical fibers to intermediate optical fibers.

4. The telecommunication fiber optic distribution apparatus as defined in claim 1 wherein one of the trays contains multiple cross-connect connectors for selectively interconnecting the second optical fibers with intermediate optical fibers.

5. The telecommunication fiber optic distribution apparatus as defined in claim 1 wherein the carrier intermediate section comprises a plurality of interconnected articulating links that are pivotable relative to adjacent links in a limited arc to prevent the fibers from being bent in an arc having a radius of curvature that is less than the prescribed value during such tray movement.

6. The telecommunication fiber optic distribution apparatus as defined in claim 5 wherein the links are releasably interconnected to each other.

7. The telecommunication fiber optic distribution apparatus as defined in claim 1 wherein each of the trays has a floor wall and wherein each of the intermediate articulating sections is slidably mounted on the floor wall for movement in a snake-like fashion when the trays are moved between the retracted positions and the extended positions.

8. The telecommunication fiber optic distribution apparatus as defined in 1 wherein each of the trays has lateral side walls and a front wall that extends laterally outward beyond the lateral side walls.

9. The telecommunication fiber optic distribution apparatus as defined in claim 8 wherein the front wall has curved ends that extend laterally outward beyond the lateral side walls.

10. The telecommunication fiber optic distribution apparatus as defined in claim 1 wherein each of the trays has a fiber storage reel for receiving extra lengths of the optical fibers.

11. The telecommunication fiber optic distribution apparatus as defined in claim 1 wherein the tray support housing has a first carrier anchor operatively connected to the one end of the carrier for stationarily anchoring the one end to the housing and wherein the tray has a second carrier anchor operatively connected to the other end of the carrier for stationarily anchoring the other end of the carrier within the tray to enable the intermediate section to move in a snake-like fashion between the retracted position and the extended position.

12. The telecommunication fiber optic distribution apparatus as defined in claim 1 comprising a plurality of vertically spaced cable guides operatively mounted to the housing for guiding the fiber optic cables vertically along the outside of the housing to the one end of the multi-fiber carriers.

13. The telecommunication fiber optic distribution apparatus as defined in claim 12 wherein each of the spaced cable guides has a movable gate that is moveable between a closed position to retain the cables within the guide and an open position to enable a cable to be placed in or removed from the guide.

14. The telecommunication fiber optic distribution apparatus as defined in claim 13 wherein the spaced cable guides have a latch means for releasably securing the movable gate in the closed position.

15. A telecommunication fiber optic distribution apparatus for cross-connecting first optical fibers from a multi-fiber cable to second optical fibers from a plurality of distribution cables, comprising:

an upright frame a tray support housing mounted on the frame forming an enclosure having a rear wall, side walls, a top wall and a bottom wall;

a plurality of vertically spaced horizontal tray guides mounted to the housing;

a plurality of optical fiber trays mounted within the housing enclosure supported on the horizontal tray guides for movement relative to the rear wall between retracted storage positions in which the trays are within the enclosure and extended service positions in which the trays extend outward from the enclosure;

elongated multi-fiber carriers mounted within the trays, each having one end operatively connected to the support housing and an opposite end operatively connected to the tray and an articulating intermediate section that retracts and extends with corresponding movement of the trays for receiving and supporting the first and second optical fibers within the trays to protect and prevent the fibers from being bent in an arc having a radius of curvature that is less than a prescribed value during such tray movement.

16. The telecommunication fiber optic distribution apparatus as defined in claim 15 wherein each tray has a pair of carriers, one for receiving and supporting incoming fibers and one for receiving and supporting outgoing fibers.

17. The telecommunication fiber optic distribution apparatus as defined in claim 15 wherein one of the trays contains multiple splice connectors for optically interconnecting the first optical fibers to intermediate optical fibers.

18. The telecommunication fiber optic distribution apparatus as defined in claim 15 wherein one of the trays contains multiple cross-connect connectors for selectively interconnecting the second optical fibers with intermediate optical fibers.

19. The telecommunication fiber optic distribution apparatus as defined in claim 15 wherein the carrier intermediate section comprises a plurality of interconnected articulating links that are pivotable relative to adjacent links in a limited arc to prevent the fibers from being bent in an arc having a radius of curvature that is less than the prescribed value during such tray movement.

20. The telecommunication fiber optic distribution apparatus as defined in claim 19 wherein the links are releasably interconnected to each other.

21. The telecommunication fiber optic distribution apparatus as defined in claim 15 wherein each of the trays has a floor wall and wherein each of the intermediate articulating sections is slidably mounted on the floor wall for movement in a snake-like fashion when the trays are moved between the retracted positions and the extended positions.

22. The telecommunication fiber optic distribution apparatus as defined in 15 wherein each of the trays has lateral side walls and a front wall that extends laterally outward beyond the lateral side walls.

23. The telecommunication fiber optic distribution apparatus as defined in claim 22 wherein the front wall has curved ends that extend laterally outward beyond the lateral side walls.

24. The telecommunication fiber optic distribution apparatus as defined in claim 15 wherein each of the trays has a fiber storage reel for receiving extra lengths of the optical fibers.

25. The telecommunication fiber optic distribution apparatus as defined in claim 15 wherein the tray support housing has a first carrier anchor operatively connected to the one end of the carrier for stationarily anchoring the one end to the housing and wherein the tray has a second carrier anchor operatively connected to the other end of the carrier for stationarily anchoring the other end of the carrier within the tray to enable the intermediate section to move in a snake-like fashion between the retracted position and the extended position.

26. The telecommunication fiber optic distribution apparatus as defined in claim 15 comprising a plurality of vertically spaced cable guides operatively mounted to the housing for guiding the fiber optic cables vertically to the one end of the multi-fiber carriers.

27. The telecommunication fiber optic distribution apparatus as defined in claim 26 wherein each of the spaced cable guides has a movable gate that is moveable between a closed position to retain the cables within the guide and an open position to enable a cable to be placed in or removed from the guide.

* * * * *